United States Patent [19]

Love

[11] Patent Number: 5,137,280

[45] Date of Patent: Aug. 11, 1992

[54] GEOGRAPHICAL GAME

[76] Inventor: Samuel D. Love, 13510 Old Indian Head Rd., Brandywine, Md. 20613

[21] Appl. No.: 658,794

[22] Filed: Feb. 13, 1991

Related U.S. Application Data

[63] Continuation-in-part of Ser. No. 483,635, Feb. 23, 1990, Pat. No. 5,012,226.

[51] Int. Cl.[5] ............................................. A63F 3/00
[52] U.S. Cl. .................................. 273/282.1; 273/288
[58] Field of Search ................ 273/282, 288, 237, 260

[56] References Cited

U.S. PATENT DOCUMENTS

| | | | |
|---|---|---|---|
| 1,315,483 | 9/1919 | Edwards | 273/288 |
| 4,090,717 | 5/1978 | Rossetti | 273/249 |
| 4,667,965 | 5/1987 | Helms, Jr. | 273/282 R |
| 4,674,752 | 6/1987 | Brothers | 273/254 |
| 4,844,473 | 7/1989 | Landsberg | 273/282 |

Primary Examiner—Edward M. Coven
Assistant Examiner—Steven B. Wong
Attorney, Agent, or Firm—Oliff & Berridge

[57] ABSTRACT

An entertainment/educational game is provided which teaches players thereof about geography. The game includes a playing surface having a geographical area divided into subregions illustrated thereon, the geographical area and subregions having geographically significant shapes. A plurality of elongated, flexible members (e.g., colored strings) having fixed, equal lengths are provided as playing pieces, one for each player (or team). An object of the game is to accumulate points while attaching ones playing piece to the playing surface within subregions to achieve some predefined goal (e.g., extending one's playing piece across the geographical area or forming a loop with one's playing piece), while attaching one's playing piece to at least a minimum number of subregions. Players draw cards which include indicia corresponding to one of the subregions. Players attach a portion of their playing piece to the playing surface within a subregion if they can locate the subregion within a preset time period. Players accumulate points by identifying the subregions on the playing surface and by reciting additional information about the selected subregion (e.g., if the subregion is a state or country, by reciting the capital of the state or country) also within the preset time period. When played within an automobile, the operator can actuate the timer, which assists in maintaining a level of alertness in the operator.

20 Claims, 12 Drawing Sheets

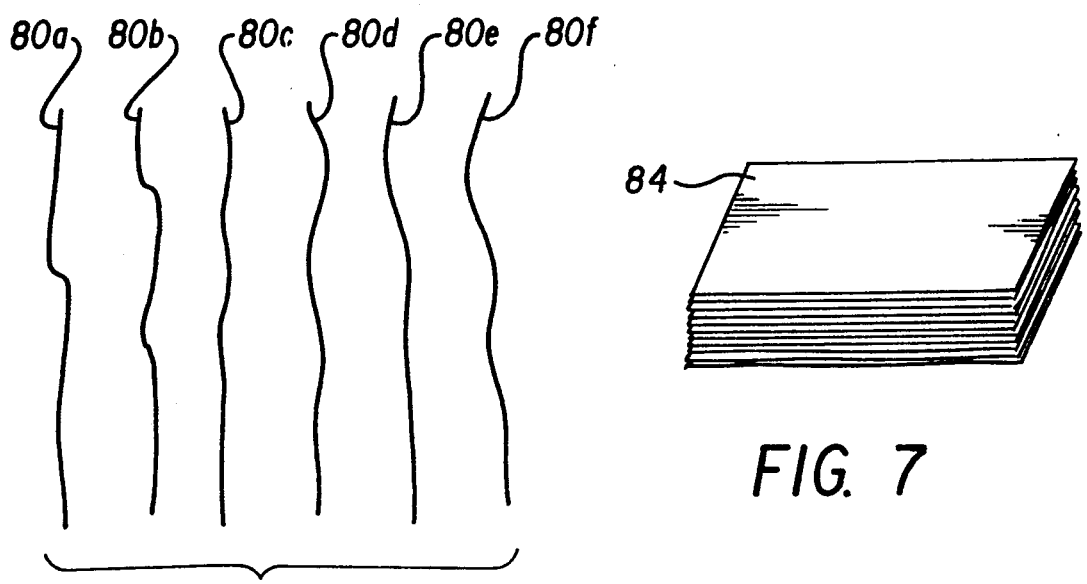
FIG. 6A
FIG. 7
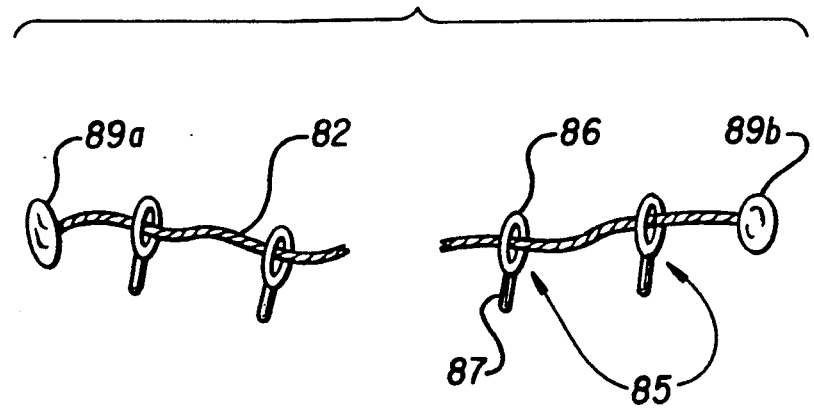
FIG. 6B

| CLUBS | | STATES | CAP. CITIES | LARGEST CITY |
|---|---|---|---|---|
| 1 | 2 | ALABAMA | MONTGOMERY | BIRMINGHAM |
| 2 | 3 | ALASKA | JUNEAU | ANCHORAGE |
| 3 | 4 | ARIZONA | PHOENIX | PHOENIX |
| 4 | 5 | ARKANSAS | LITTLE ROCK | LITTLE ROCK |
| 5 | 6 | CALIFORNIA | SACRAMENTO | LOS ANGELES |
| 6 | 7 | COLORADO | DENVER | DENVER |
| 7 | 8 | CONNECTICUT | HARTFORD | HARTFORD |
| 8 | 9 | DELAWARE | DOVER | WILMINGTON |
| 9 | 10 | FLORIDA | TALLAHASSEE | MIAMI |
| 10 | J | GEORGIA | ATLANTA | ATLANTA |
| 11 | Q | HAWAII | HONOLULU | HONOLULU |
| 12 | K | IDAHO | BOISE | BOISE |
| 13 | A | ILLINOIS | SPRINGFIELD | CHICAGO |
| DIAMONDS | | | | |
| 14 | 2 | INDIANA | INDIANAPOLIS | INDIANAPOLIS |
| 15 | 3 | IOWA | DES MOINES | DES MOINES |
| 16 | 4 | KANSAS | TOPEKA | WICHITA |
| 17 | 5 | KENTUCKY | FRANKFORT | LOUISVILLE |
| 18 | 6 | LOUISIANA | BATON ROUGE | NEW ORLEANS |
| 19 | 7 | MAINE | AUGUSTA | PORTLAND |
| 20 | 8 | MARYLAND | ANNAPOLIS | BALTIMORE |
| 21 | 9 | MASSACHUS'S | BOSTON | BOSTON |
| 22 | 10 | MICHIGAN | LANSING | DETROIT |
| 23 | J | MINNESOTA | ST. PAUL | MINNEAPOLIS |
| 24 | Q | MISSISSIPPI | JACKSON | JACKSON |
| 25 | K | MISSOURI | JEFFERSON CY. | ST. LOUIS |
| 26 | A | MONTANA | HELENA | GREAT FALLS |

| HEARTS | | | | |
|---|---|---|---|---|
| 27 | 2 | NEBRASKA | LINCOLN | OMAHA |
| 28 | 3 | NEVADA | CARSON CITY | LAS VEGAS |
| 29 | 4 | N. HAMPSHIRE | CONCORD | MANCHESTER |
| 30 | 5 | N. JERSEY | TRENTON | NEWARK |
| 31 | 6 | N. MEXICO | SANTA FE | ALBUQUERQUE |
| 32 | 7 | NEW YORK | ALBANY | N.Y. CITY |
| 33 | 8 | N. CAROLINA | RALEIGH | CHARLOTTE |
| 34 | 9 | N. DAKOTA | BISMARK | FARGO |
| 35 | 10 | OHIO | COLUMBUS | CLEVELAND |
| 36 | J | OKLAHOMA | OKLAHOMA CY. | OKLAHOMA CY. |
| 37 | Q | OREGON | SALEM | PORTLAND |
| 38 | K | PENNSYLVANIA | HARRISBURG | PHILADELPHIA |
| 39 | A | RHODE ISLAND | PROVIDENCE | PROVIDENCE |
| SPADES | | | | |
| 40 | 2 | S. CAROLINA | COLUMBIA | COLUMBIA |
| 41 | 3 | S. DAKOTA | PIERRE | SIOUX FALLS |
| 42 | 4 | TENNESSEE | NASHVILLE | MEMPHIS |
| 43 | 5 | TEXAS | AUSTIN | HOUSTON |
| 44 | 6 | UTAH | SALT LAKE CY | SALT LAKE CY |
| 45 | 7 | VERMONT | MONTPELIER | BURLINGTON |
| 46 | 8 | VIRGINIA | RICHMOND | NORFOLK |
| 47 | 9 | WASHINGTON | OLYMPIA | SEATTLE |
| 48 | 10 | W. VIRGINIA | CHARLESTON | CHARLESTON |
| 49 | J | WISCONSIN | MADISON | MILWAUKEE |
| 50 | Q | WYOMING | CHEYENNE | CHEYENNE |
| 51 | K | WASH. D.C. | | |
| 52 | A | WILD CARDS | | |
| JOKERS | | PICK STATE | | |

FIG. 8 (cont.)

GEOGRAPHICAL GAME

BACKGROUND OF THE INVENTION

This application is a Continuation-in-Part of U.S. Patent Application Ser. No. 07/483,635, filed Feb. 23, 1990, now U.S. Pat. No. 5,012,226.

1. Field of the Invention

The present invention relates to a game and method of playing a game wherein players are entertained while being educated about geography, and in particular, to a game which can be used in an automobile to additionally assist in maintaining the alertness of an operator of the automobile when the Safety Alertness Monitoring System disclosed in the above-referenced U.S. patent application is used as a timer for the game.

2. Description of Related Art

A number of games for teaching geography have been disclosed. Some of these games include, as a part of their play, traveling across a geographically significant area according to predetermined paths. Many of these games have as an object, the goal of educating while entertaining the players.

U.S. Pat. No. 613,435 to Wright, Jr. discloses a game apparatus which uses a map of the United States as a playing board. Cities within the map are connected by routes. A player must answer a question upon landing on a city in order to continue on. An inland route and a coast-line route can be played depending on the desired game length. A player's turn length is determined by a mileage ticket, as shown in FIG. 3. The players use game numbers as shown in FIG. 2. A sample question card is shown in FIG. 4.

U.S. Pat. No. 4,609,359 to Erickson et al discloses an educational game for developing recognition skills regarding map items, such as states. To take his turn, a player selects a card which has a code and a name of a state on it. The code is dialed into a number of switches which connect with a particular electrical path. Then, the player uses an electrode to touch the state on the map which corresponds to the name indicated on the card, which completes the electrical path and lights a light. The card could also have a state's capital on it.

U.S. Pat. No. 4,449,941 to McGuire et al discloses an educational device for learning geographical names and locations wherein a cartridge with a state's information is inserted into a slot which completes an electrical circuit and lights a lamp 31 which is within the state. The lamp can be located at the state's capital as well. The cartridge interacts with the slot through a connector.

U.S. Pat. No. 3,363,902 to Jones discloses a geographical game including means for checking correct plays wherein each player has pegs which are inserted into a hole in a map. To determine a correct answer, the reverse side of the map has a number under each hole which is compared to the number on the peg.

U.S. Pat. No. 2,268,433 to Smith discloses an amusement game wherein a map with a plurality of different routes is shown. A number of games are disclosed including a capital city game wherein players try to guess the name of a state's capital.

U.S. Pat. No. 1,551,895 to Magar discloses an educational game wherein various geographical information about the U.S., including state names and locations, state capitals and industries of the state, is learned. The object of the game is to move across the country while passing through a maximum number of cities.

Additional patents of interest include U.S. Pat. Nos.: 4,961,582 to Van Lysel; 4,937,181 to Rogers; 4,966,372 Robison; and 4,949,975 to Carrier.

A continuing need for educational/entertainment games exists. Providing levels of competition assists in increasing the entertainment value of a game, particularly for older age groups, and provides further motivation to learn the material being taught. Games which require strategy also can provide more entertainment to the players.

Additionally, the provision of a game which can be played by passengers (e.g., children) in an automobile assists in pacifying these children, particularly during long trips, and in general, increases their level of enjoyment of the trip. Further, a game which requires interaction of the automobile operator can assist in maintaining a desired level of alertness in the operator because the passengers who are playing the game will be able to quickly detect a decreasing level of alertness in the operator.

OBJECTS AND SUMMARY OF THE INVENTION

It is an object of the present invention to provide a game and method of playing a game which entertains and educates the players thereof in the field of geography.

It is another object of the present invention to provide a game which has different levels of competition and complexity so that players having a wide range of ages will be entertained and educated by the playing thereof.

It is a further object of the present invention to provide a game which can be played in an automobile, even in darkness, and which can assist in maintaining a desired level of alertness in the operator of the automobile.

To achieve the above and other objects, and to overcome the shortcomings discussed above, an entertainment/educational game is provided which teaches players thereof about geography. The game includes a playing surface having a geographical area divided into subregions illustrated thereon, the geographical area and subregions having geographically significant shapes. A plurality of elongated, flexible members (e.g., colored cords or strings) having fixed, equal lengths are provided as playing pieces, one for each player (or team). An object of the game is to accumulate points while attaching one's elongated, flexible member to the playing surface within subregions to achieve some predefined goal (e.g., extending one's elongated, flexible member across the geographical area or forming a loop with one's elongated, flexible member), while attaching one's elongated, flexible member to at least a minimum number of subregions. Players draw cards which include indicia corresponding to one of the subregions. Players attach a portion of their elongated, flexible member to the playing surface within a subregion if they can locate the subregion within a preset time period. Players accumulate points by identifying the subregions on the playing surface and by reciting additional information about the selected subregion (e.g., if the subregion is a state or country, by reciting the capital of the state or country) also within the preset time period. When played within an automobile, the operator can actuate the timer, which assists in maintaining a level of alertness in the operator.

BRIEF DESCRIPTION OF THE DRAWINGS

The invention will be described in detail with reference to the following drawings in which like reference numerals refer to like elements and wherein:

FIG. 6A shows six elongated, flexible members which are used as playing pieces in the present invention;

FIG. 6B shows one preferred construction of an elongated, flexible member along with pins for attachment thereof to a playing surface;

FIG. 7 shows a deck of cards which contain indicia corresponding to a subregion, or state, illustrated on the playing surface shown in FIG. 5;

FIG. 8 is a plan view of a correlation chart which correlates an ordinary deck of playing cards to each state of the United States and also lists the capital and largest city of each state;

DETAILED DESCRIPTION OF THE PREFERRED EMBODIMENTS

The Safety Alertness Monitoring System

A safety alertness monitoring system which optionally can be used as a timer with the game of the present invention will first be described. This monitoring system, or timer, is also described in U.S. Patent Application Ser. No. 07/483,635.

Figure 1A:
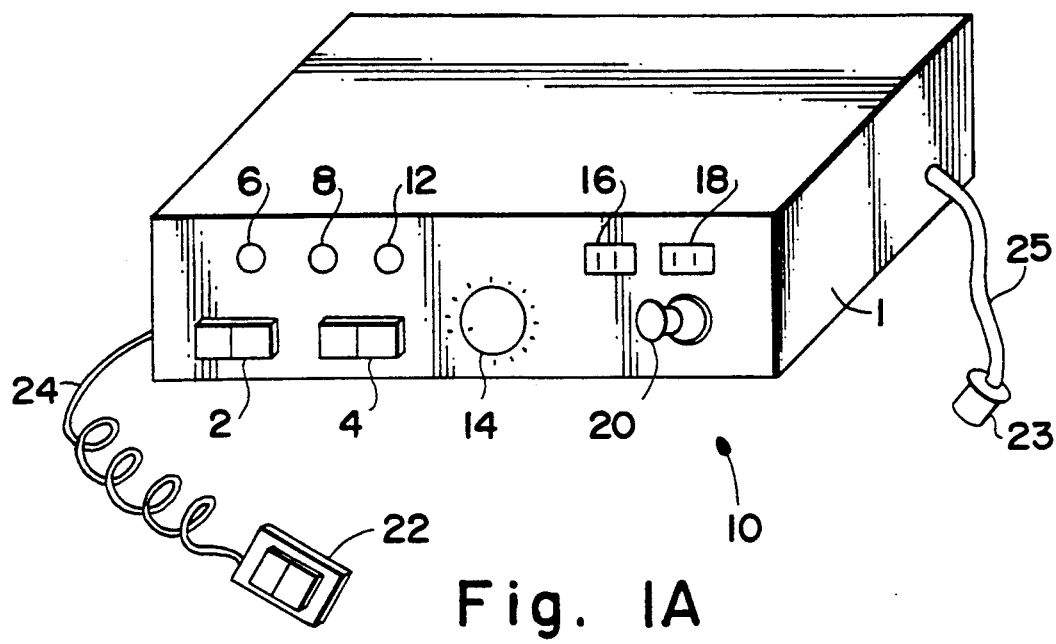
FIGS. 1A and 1B are isomeric views of two embodiments of the safety alertness monitoring system disclosed in U.S. Patent Application Ser. No. 07/483,635 which can be used as a timer in the present invention.
Figure 1B:
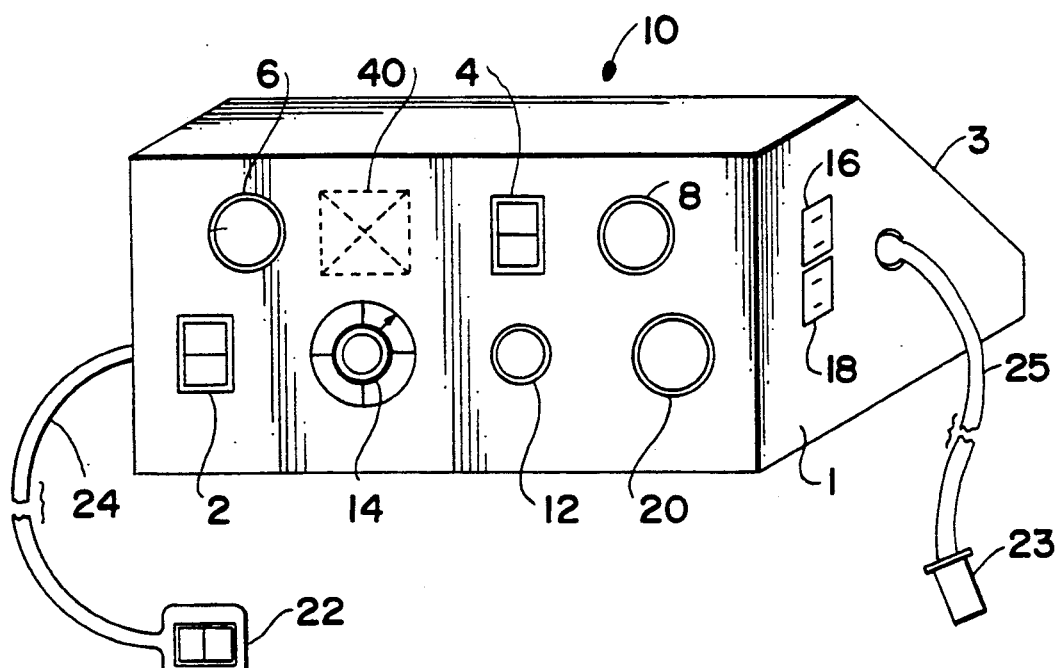

FIGS. 1A and 1B show preferred embodiments of a safety alertness monitoring system 10 which is usable as a timer with the present invention. The embodiments of FIG. 1A and FIG. 1B differ from each other in the arrangement of components on the housing and in the shape of the housing. Particularly, the rear section 3 of housing 1 in FIG. 1B is tapered to reduce the overall size of the device and, more importantly, to facilitate placement of device 10 on a vehicle dashboard alongside the windshield or under the dashboard atop the transmission housing. The safety alertness monitoring system 10 includes an outer housing 1 which contains the internal components, to be discussed later, of the system. The front face of the safety alertness monitoring system 10 includes three lights 6, 8 and 12 which function to inform the user of the various conditions of the safety alertness monitoring system 10. Specifically, light 6 is a flashing waiting light which indicates that the system is in a "waiting mode", light 8 is a flashing timing light which indicates that a first predetermined time period of the "timing mode" has been counted and light 12 is a pilot light which indicates that the system is in the "timing mode". The system also includes an alarm 40 (shown in FIGS. 1B and 4) which is operative after a second predetermined time period of the "timing mode" has expired. Power is provided to the system illustrated in FIGS. 1A and 1B by plug 23 which can be inserted into a standard vehicle cigarette lighter. Plug 23 is attached to the internal components of the device by cord 25. The front panel of housing 1 also includes an on/off switch 4 which can be used to prevent light 8 from flashing. Dial 14 is provided for setting the predetermined time periods which will be discussed below. Housing also includes an on/off receptacle 18, an off/on receptacle 16 (both of which will be discussed below) and, optionally, a cigarette lighter 20. Switch 22 is provided for actuation by an operator of the vehicle and is attached to housing 1 by cord 24. Cords 24 and 25 can be stretch-type cords so that they take up a minimal amount of space in the vehicle compartment.

Figure 2A:
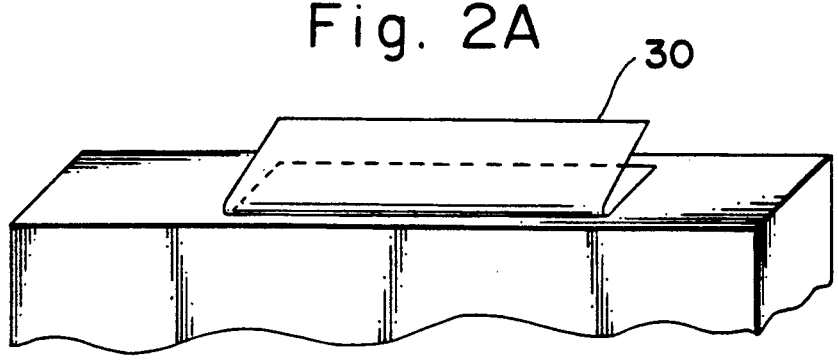
FIGS. 2A, 2B and 2C are three alternative embodiments of mounting structures usable for mounting the timer of FIGS. 1A and 1B in an automobile.
Figure 2B:
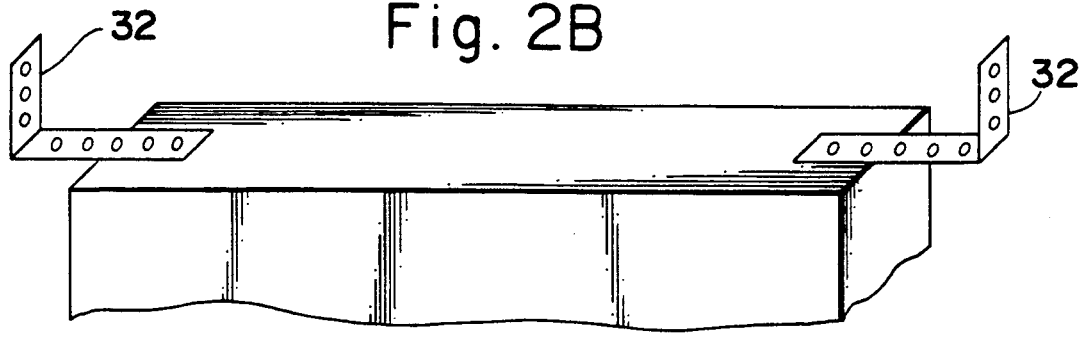
Figure 2C:
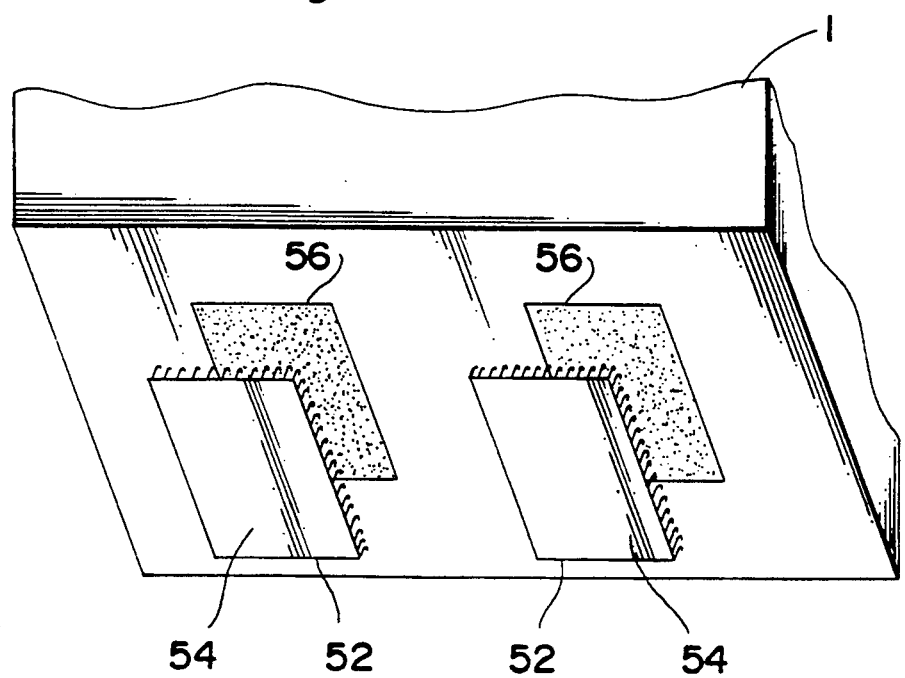

An advantage of disclosed safety alertness monitoring system resides in its ability to be easily installed in any vehicle. Thus, a vehicle operator who desires to use the safety alertness monitoring system 10 need not rely on the automobile manufacturer or any other person to install the system in a vehicle, but can simply purchase the safety alertness monitoring system and begin using it by inserting plug 23 into a standard cigarette lighter. The system need not use any of the vehicle's own components as alarms and therefore can be easily used in a number of vehicles. Although housing 1 can simply be placed on the front seat of the car, the glove compartment or on the dashboard, additional mounting structure, illustrated in FIGS. 2A, 2B and 2C, can also be used for attachment. FIG. 2A shows a clip 30 for clipping housing 1 on, for example, a standard sun visor provided in all vehicles. FIG. 2B shows a set of brackets 32 which can be used for mounting housing 1 underneath the dashboard. FIG. 2C shows an embodiment wherein VELCRO hook-and-loop-type fasteners 50,52 are used to mount housing 1 to, for example, the upper surface of a vehicle dashboard. The embodiment of FIG. 2C includes a first set of fasteners 50 and a second set of fasteners 52 which are attached to housing 1 and a vehicle dashboard, respectively, by, for example, adhesive which can be provided on a base surface 54 of the fasteners. It is understood that a single or plurality of mounting fasteners 50,52 can be provided and that these fasteners can be provided in various colors to match the interior color of the vehicle. Alternatively, a VELCRO harness can be provided which removably holds the safety alertness monitoring system 10 and mates with corresponding VELCRO patches that may be attached to selected locations within the vehicle. Similarly, various other mounting structures can be used for removably mounting the safety alertness monitoring system in the internal compartment of a vehicle.

Figure 3A:
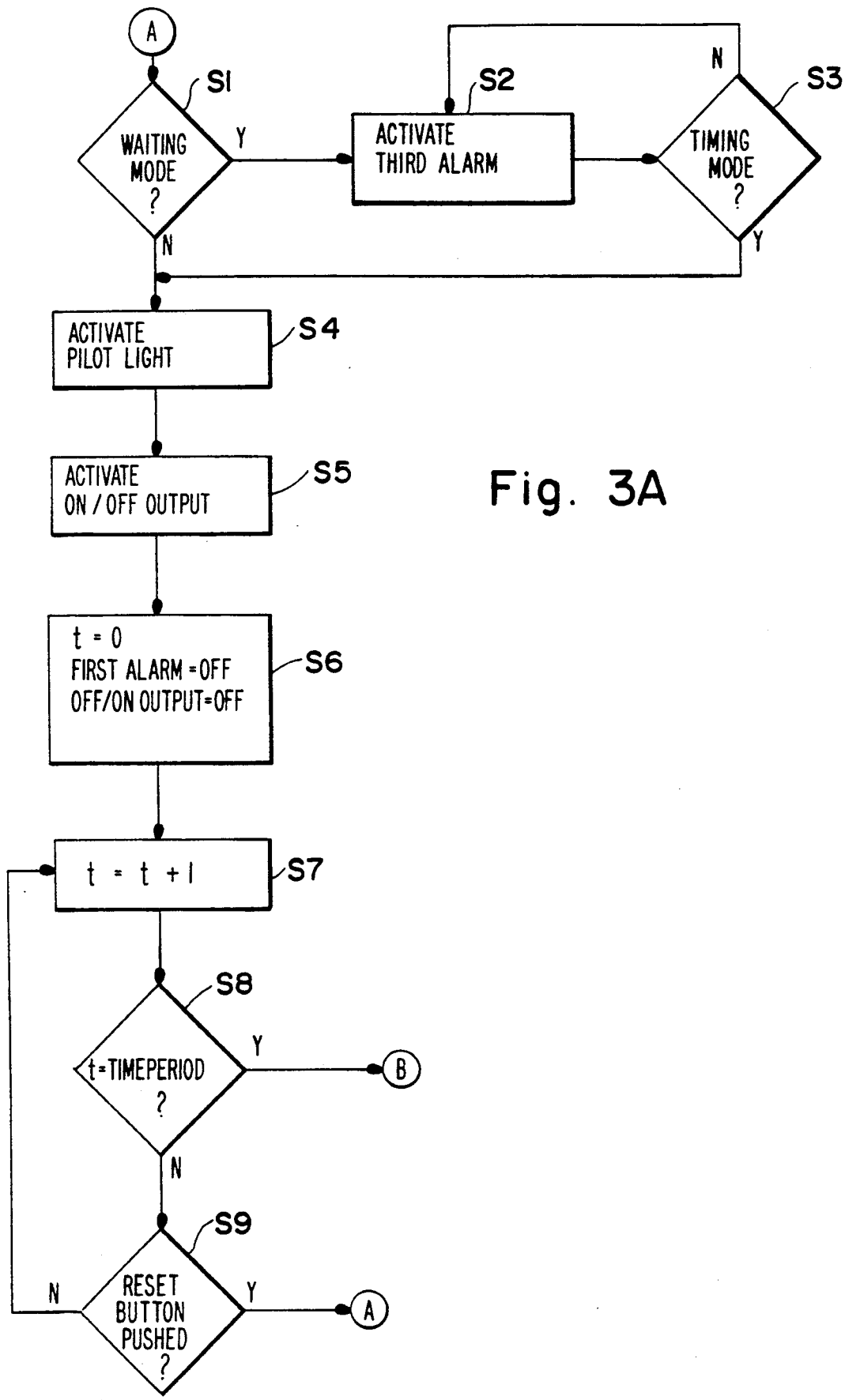
FIGS. 3A and 3B are a schematic block diagram circuit for a safety alertness monitoring system usable as a timer in the present invention.
Figure 3B:
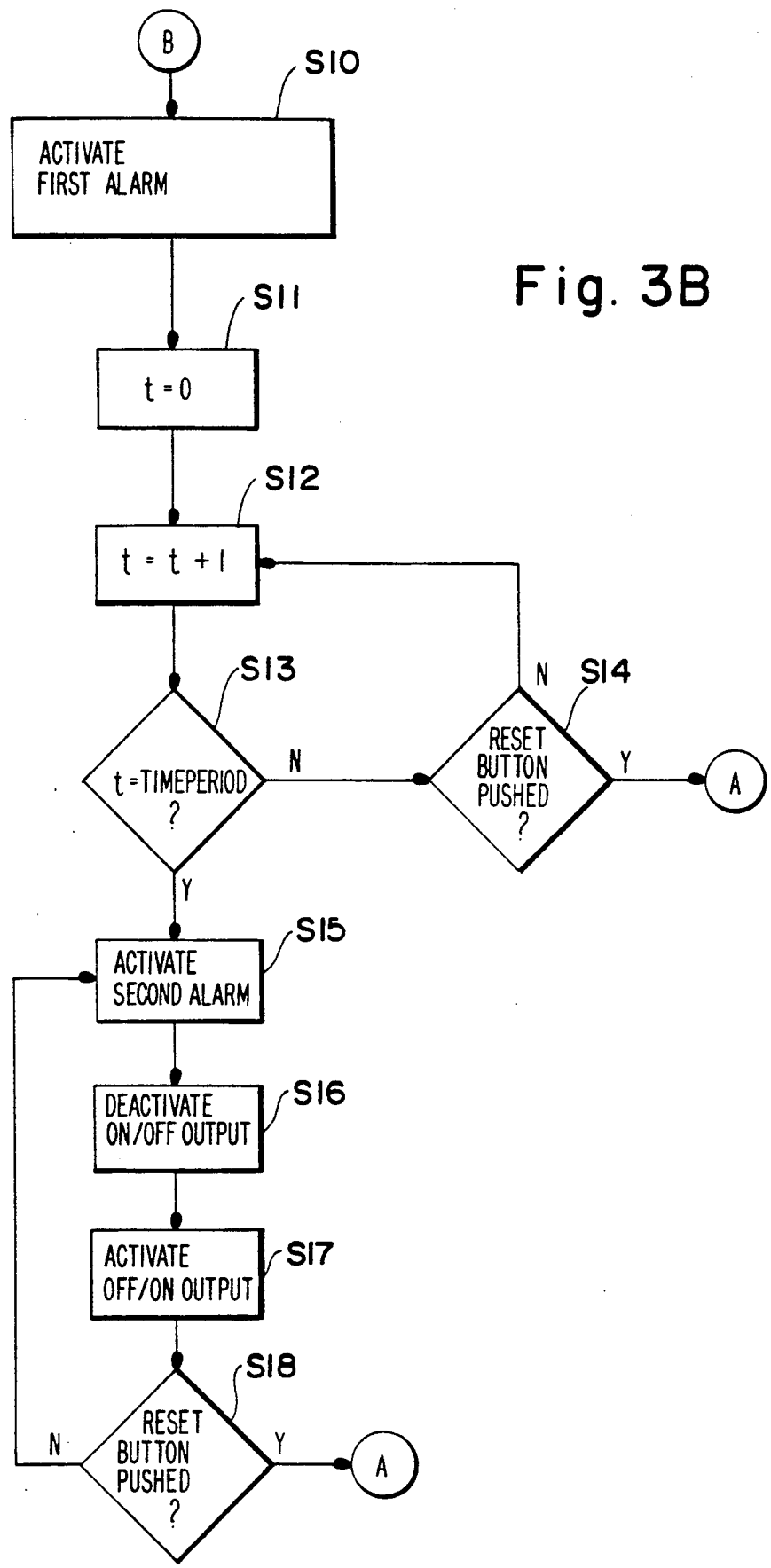

FIGS. 3A-3B illustrate a schematic block diagram circuit for the safety alertness monitoring system 10. In step 1 (S1), it is determined whether the system is in the "waiting mode". If the system is in the "waiting mode" waiting light 6 is activated in S2. The "waiting mode" can be used under several conditions. The more important uses are: a) for momentarily shutting off and recycling the "timing mode" (to be described below); b) as an alternative to using the power shut off switch 2 when the motor vehicle is standing at traffic lights or other brief stops when the "timing mode" is not desired to be used; and c) to defer the involvement of the "timing mode" while driving in congested traffic, yet maintaining the alerting function of the safety alertness monitoring system by providing the flashing of light 6. Thus, an alarm or alertness function is provided by flashing light 6, although the level of alertness provided by the "waiting mode" is less than that provided by the "timing mode" because no operator interaction is required to prevent further alertness functions from occurring. In S3, a determination is made as to whether the system is in the "timing mode", for example, by determining whether switch 22 has been actuated. The system remains in the "waiting mode" until switch 22 has been actuated.

Once in the "timing mode" pilot light 12 is lighted (S4), on/off output 18 is supplied with power (S5) and the timer is initialized (S6). In the "timing mode" alert light 8 and off/on output 16 are initially not supplied with power. The timer 38 (see FIG. 4) is set to zero and begins to count the first predetermined time period. The first predetermined time period can be adjustably set by dial 14. As long as timer 38 does not count to the first predetermined time period, and a reset button (which can correspond to switch 22) is not actuated, the value counted by the timer is incremented (S7). If it is determined in S9 that the reset button has been pushed the safety alertness monitoring system 10 returns to the waiting mode and the entire procedure begins again. In the preferred embodiment, where switch 22 is an on/on double-pole rocker switch, a first position of the switch actuates the "waiting mode" and a second position of the switch actuates the "timing mode". Thus, once in the "timing mode" an operator is required to move switch 22 to the first position which actuates the "waiting mode" and then immediately move switch 22 to the second position to restart the "timing mode". After a very short period of time, an operator will become accustomed to the rhythm of sequentially moving switch 22 between the second and first positions to repeatedly reset timer 38 and prevent the first predetermined time period from being counted by the timer 38.

If the first predetermined time period is determined to be counted in S8 by timer 38, the system proceeds to S10 whereby a first alarm is activated. In the preferred embodiment, the first alarm is a flashing alert light 8. At this time, a second predetermined time period begins to be counted. In the preferred embodiment, timer 38 is a two-phase timer which counts a first predetermined time period followed by a second predetermined time period equal to the first predetermined time period. However, it is apparent that two separate timers having separate adjustments could also be used to count the first and second predetermined timer periods, respectively. In S11 the second predetermined time period is initialized and in S12 the value of the timer is incremented until either the second predetermined time period is determined to have been counted in S13 or a reset button (which corresponds to switch 22 in the preferred embodiment) is determined to have been actuated in S14. If the reset button is pushed, the system switches back to the waiting mode as in S9. When the second time period is determined to have been counted by timer 38 in S13, a second alarm (buzzer 40 in the preferred embodiment) is actuated (S15), on/off output 18 is deactivated (S16) and off/on output 16 is activated (S17). This state continues until reset button is actuated in S18.

It is likely that the sounding of buzzer 40 should inform the vehicle operator and passengers of the deteriorating alertness of the vehicle operator so that appropriate corrective measures can be taken. However, it is also possible to power additional actuating devices, such as relays, from off/on output 16, which actuation devices could actuate vehicle components such as the brakes, windshield wipers or emergency flashers, or deactivate the throttle. Although these additional actuation devices require installation of components, such as relays, into the vehicle's electrical system, the safety alertness monitoring system 10 of the present invention remains portable because the power supplied to these additional actuation devices comes from the off/on output 16 from which the additional actuation devices can be easily disconnected.

Figure 4:
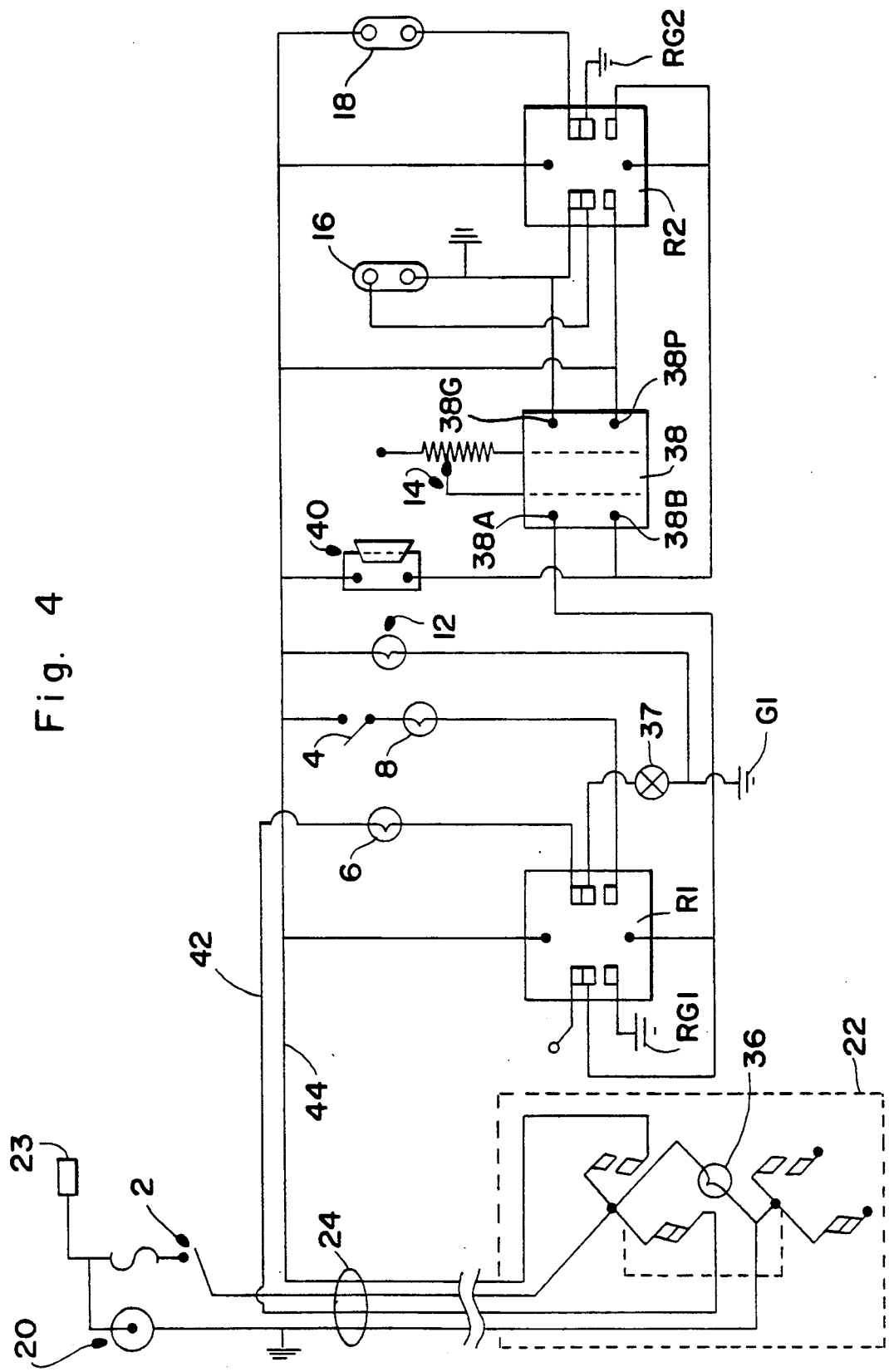
FIG. 4 is a circuit diagram of one form of timing usable as the safety alertness monitoring system.

FIG. 4 illustrates a circuit diagram of one form of timing circuit usable in the present invention. Switch 22 is an on/on double pole rocker switch which is supplied with power from, for example, a vehicle's cigarette lighter (not shown) and provides power to hot wires 42 and 44 when in first and second positions, respectively. Rocker switch 22 also includes a light 36 which enables switch 22 to be easily located in the compartment of a vehicle regardless of the external lighting conditions. When in the first position, power is supplied to hot wire 42 and light 6 is actuated. A flasher 37 is provided in series with light 6 via a relay R1 so that the light 6 will flash. Relay R1 maintains flasher 37 is series with light 6 when the relay R1 is in a deactivated state. When in the second position, the "timing mode" is initialized and power is no longer supplied to hot wire 42. Upon initialization of the "timing mode" pilot light 12 is actuated and power is supplied to timer 38 through its positive terminal 38P. Timer is connected to ground through its internal ground 38G. When in the "timing mode" the system operates by having timer 38 activate relays R1 and R2 after counting first and second predetermined time periods, respectively. Once placed in the "timing mode", timer 38 increments its value unless it is reset by an operator moving switch 22 to its first position which cuts off the power to hot wire 44 and resets timer 38. After counting a first predetermined time period, timer 38 attaches relay R1 to ground by closing a gate between terminal 38A and internal ground 38G. At this time, relay R1 becomes activated whereby relay R1 is permanently grounded through ground RG1 and alert light 8 is communicated with flasher 37 and ground G1. Thus, after counting the first predetermined time period, alert light 8 will begin to flash. The circuit including alert light 8 also includes an optional switch 4 which can be opened if, for example, the vehicle operator does not want to disturb sleeping passengers in the vehicle with the flashing alert light 8. However, the alarm function is still achieved since the movement of relay R1 to the activated position can be heard by the vehicle operator.

If the vehicle operator does not actuate switch 22 in a response to either seeing flashing light 8 or hearing relay R1, timer 38 begins counting the second predetermined time period. When the second predetermined time period has been counted, terminal 38B and internal ground 38G are connected, thus grounding relay R2. When grounded, relay R2 becomes activated so that it is placed in contact with permanent ground RG2, on/off output 18 is deactivated, buzzer 40 sounds and off/on output 16 is activated. The system will remain in this state until switch 22 is actuated.

The safety alertness monitoring system presents to the motor vehicle public a positive device for establishing and maintaining a higher degree of alertness for drivers. This is accomplished by a combination of alerting functions and subtle responses involved in operating the device. This action-response system can very well enhance the driver's normal alertness level. In addition to that factor, the action-response combination will cause the driver's lack of alertness to be known by other passengers in the vehicle. Soon after drivers operate this timing device, they develop a rhythm of the timing cycle and press the control switch in some selected time frame. An alert driver can maintain that rhythm or even change the rhythm or the cycle, yet maintain consistency of operation for long periods of time. However, when the driver's alertness starts to deteriorate, the rhythm of the switching becomes obvious to alert passengers, if not to the driver. In this way the passengers will obtain notice of the driver's condition, much in advance of any such information obtained by other means. This information can prompt a change in drivers or closer monitoring of the same driver. Hopefully, the action taken will prevent a motor vehicle accident.

The provision of on/off output 18 enables the safety alertness monitoring system to be used as a power base for supplying power to, for example, games (examples of which are provided below) usable by passengers, especially children. However, since on/off output 18 is deactivated upon expiration of the second predetermined time period, the users of the games will be made aware of the driver's lack of alertness, enabling them to take appropriate actions regarding the alertness of the driver. Additionally, off/on output 16 is provided for the attachment of additional alarms or devices intended to be activated upon the expiration of the second predetermined time period. For example, devices for triggering the brakes, lights, horns, sirens, or relays controlling other devices can be attached to output 16.

While plug 23 for insertion into a cigarette lighter is described, other connectors which allow for easy connection and disconnection from the vehicle's power supply and thus portability of the device can also be provided. Additionally, alarms other than the above-described flashing lights and buzzers can be substituted for lights 6 and 8 and buzzer 40. Furthermore, while an on/on double pole rocker switch is described, other switches can be used including separate switches for activating the "waiting mode" and "timing mode", respectively, however the above-described switch is preferable because it enables the entire device to be operated from a single switch which can be easily held in the hand of an operator while driving.

Lenses (not shown) can also be provided over lights 6, 8 and 12 for protecting users of the device from being injured by hot or broken lights, to protect the lights from being damaged and to enable users of the present invention to vary the colors provided by lights 6, 8 and 12 as needed. In this manner, more light can be provided, for example, in the day time and less at night. These lenses can be removably attached to the outer surface of housing 1 over lights 6, 8 and 12.

The game disclosed by the present invention (to be described in detail below) can be played using the safety alertness monitoring system disclosed above as a timer. Any of the alarms provided by the safety alertness monitoring system can be used to indicate the expiration of a preset time period in the game, which indicates the expiration of one player's turn. For example, the flashing of light 8 which indicates that the first predetermined time period has expired can be used to indicate the expiration of a player's turn, or a player's turn can continue after the expiration of the first predetermined time period and expire when buzzer 40 is sounded after the second predetermined time period has been counted. Alternatively, the safety alertness monitoring system illustrated in FIGS. 1-4 can be used with an auxiliary timer/light source 100 (illustrated in FIG. 10), to be described below.

It will also be appreciated that any conventional timer can be used with the game of the present invention (such as, for example, a watch, or an hour-glass). However, the use of the safety alertness monitoring system illustrated in FIGS. 1-4 as a timer for the game (with or without the auxiliary timer/light source 100) when the game is being played in an automobile, permits the operator of the automobile to become involved in the game and thus maintains a desired level of alertness in the vehicle operator. For example, in order to reset and actuate the timer to begin counting a preset time period which defines a player's turn, the operator of the vehicle must actuate the reset switch 22. Should the operator fail to do so, the operator will be reminded by the players of the game, and thus it is unlikely that the operator will become sleepy or otherwise lose his alertness.

THE GAME

The game according to the present invention is an educational/entertainment device particularly suitable for teaching the subject of geography. In addition to requiring the knowledge of the location of geographically significant areas and/or subregions of such areas, the present game also requires the knowledge of information regarding those geographically significant areas or subregions. While the illustrated preferred embodiment of the present invention uses the United States as the geographically significant area, with each state as the geographically significant subregion, and additionally requires the knowledge of the capitals of the states and/or the largest city in each state, other geographically significant areas and subregions such as, for example, a state and its counties, a continent and its countries, or the entire world and its countries can also be used.

The basic components of the game include a playing surface having a geographical area divided into subregions illustrated thereon, the geographical area and the subregions having geographically significant shapes. Additionally, a plurality of elongated, flexible members, each of which has a fixed, equal length which is preferably longer than the largest dimension of the geographical area are provided, with each elongated, flexible member being used as a playing piece for each individual player or team of players. Attaching means for individually attaching each of the plurality of elongated flexible members (hereinafter referred to as playing pieces) to the playing surface within a plurality of the subregions is also required. As will be described below, a general object of the game is to traverse all or a portion of the geographical area with one's playing piece to achieve a predefined goal. Accordingly, attachment structure is provided to permit each playing piece to be attached to the playing surface (once within each selected subregion) within a plurality of subregions. A timer means for counting a preset time period and for issuing an alarm signal upon the expiration of the preset time period is also required. The preset time period constitutes the length of a player's turn, in which the player must identify a subregion on the playing surface and optionally provide some additional information about that subregion. Furthermore, a plurality of cards are provided, at least one card corresponding to each of the subregions, each card having indicia thereon which represents one of the subregions.

the game is played according to the following rules. First, the players determine the order in which they will take turns (i.e., the order of play) while playing the game. Optionally, players can form teams for playing the game. Each player (or team) selects one of the flexible, elongated members as a playing piece. Each playing piece preferably has distinctive indicia thereon (such as a color or number) which distinguishes one playing piece from another. When a player takes his turn, the following steps are performed:

the timer means is actuated to initiate the counting of the preset time period; and the player selects a first card from the deck of cards and either: identifies a subregion on the playing surface which corresponds to the indicia on the selected card, collects a first number of points (e.g., 5 points), and attaches a portion of their playing piece to the playing surface within the subregion which corresponds to the indicia on the selected first card; or returns the first card to the playing deck and selects a second card, identifies a subregion on the playing surface which corresponds to the indicia on the second card without collecting the first number of points, and attaches a portion of their playing piece to the playing surface within the subregion which corresponds to the indicia on the second card; or fails to identify the subregions on the playing surface which correspond to the indicia on the first selected card or the second selected card (if a second card is selected) prior to expiration of the preset time period.

A player may desire to select a second card from the deck if, for example: a) the player is unable to identify the subregion which corresponds to the indicia on the first selected card; b) the player had previously attached a portion of their playing piece to the subregion which corresponds to the indicia on the first selected card (players cannot attach their playing pieces to the same subregion more than once in one game); or c) the player does not desire to attach their playing piece to the subregion which corresponds to the indicia on the first selected card (i.e., that subregion does not assist the player in achieving a predefined goal of the game).

Each player takes their turn, and the players continue to play according to the above rules until a player accumulates a first predetermined level of points (for example, 100 points), has attached their playing piece to the playing surface within at least a predetermined minimum number of subregions (for example 6 subregions), and has arranged their playing piece on the geographical area according to its attachment to the subregions so as to achieve a predefined goal (to be described below).

The predefined goal is determined by the players prior to beginning play. Two examples of such goals can be: extending one's playing piece entirely across the geographical area; or forming a loop in the geographical area with one's playing piece so that one's playing piece intersects itself. While striving to achieve the predefined goal, each player must keep in mind that in order to win, the player must also attach their playing piece to the playing surface at least a minimum number of times and accumulate, for example, a first predetermined level of points.

Figure 5:
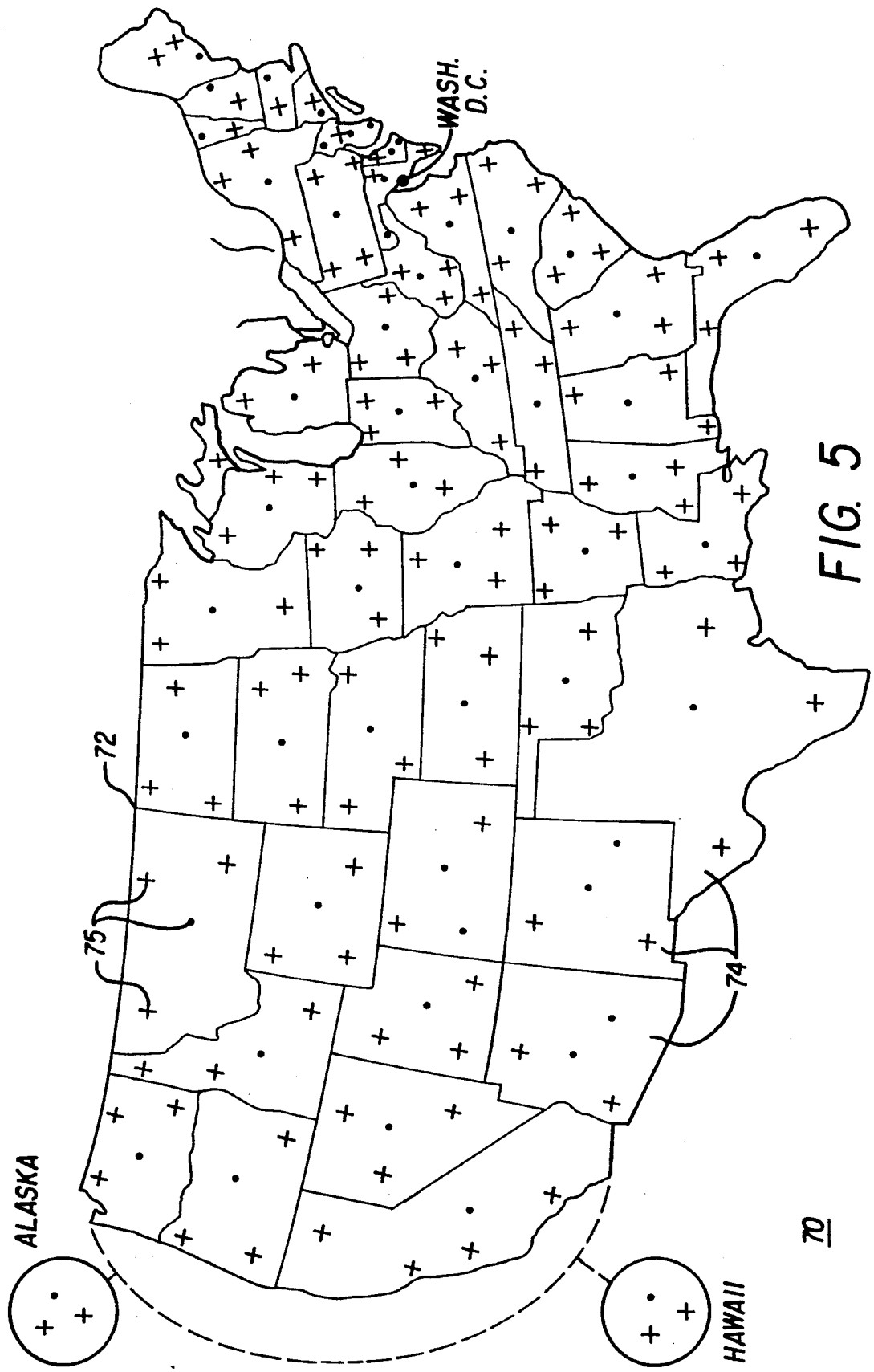
FIG. 5 is a plan view of a playing surface of the game according to one preferred embodiment of the present invention wherein the geography of the United States is to be learned.

Additional points can be accumulated by players if that player can provide additional information regarding a selected subregion during their turn after they have identified the subregion which corresponds to the indicia on their selected card and prior to the expiration of the preset time period during that turn. For example, when the geographical area is the United States and the subregions are each state, a player receives 5 points for identifying the state whose name appears on the first selected card, and an additional 10 points for identifying the capital of that state. Once the capital of a state has been identified by one player, other players cannot score the additional 10 points, but may score 5 points should they draw a card which contains indicia which corresponds to a subregion which was previously selected by another player. One example of the game according to the present invention using the geography of the United States is illustrated in FIGS. 5-11. FIG. 5 shows playing surface 70 wherein the geographical area 72 is a map of the United States. Each subregion 74 is an individual state. Each subregion, or state, includes markings 75 therein which indicate locations where players can attach their playing pieces to that subregion. Markings 75 can correspond to the locations of cities within each subregion, or be randomly spaced thereon. Additionally, one marking in each state may be specially noted as the capital of that state so that the player who identifies the capital can attach their playing piece to that particular marking to assist in keeping score, and to prevent more than one player from obtaining the bonus points (10 points) for identifying the capital of a particular state within one game.

Preferably, playing surface 70 is a map made from, for example, paper which can be mounted on a base made from, for example, cork or foam. With such an arrangement, pin-type fasteners can be used to attach playing pieces to the subregions by "tacking" a portion of a player's playing piece to the base with a pin-type fastener. Other means, some of which are described below, can also be provided for attaching playing pieces to the playing surface. Markings 75 could be apertures within the map so that the map will not be destroyed by repeated insertions of the pin-type fasteners therethrough. Such an arrangement also permits the game to be easily modified by permitting the placement of different maps on the base.

Each player could have their own board and map (although each map would be of the same geographical area), or a plurality of players could play on one board depending on the complexity of the game desired. When more than one player plays on a single board, additional rules can be provided, such as, for example, a rule that one player's playing piece cannot intersect another player's playing piece. Thus, when one goal of the game is to extend one's playing piece from the Pacific to the Atlantic coast, a first player may seek to attach their playing piece to both Texas and Minnesota in an attempt to block another player from extending their playing piece across the country. However, at the same time, the first player must keep in mind that their playing piece has a limited length, and that by extending their playing piece from Texas to Minnesota, that player may not be able to extend their own playing piece from the Atlantic to the Pacific coasts. Thus, an element of strategy is introduced into the game.

FIG. 6A illustrates a plurality of elongated, flexible members 80a–80f which are used as playing pieces in the game according to the present invention. These playing pieces can be, for example, cords or strings having different indicia (e.g., colors) thereon to distinguish one player's playing piece from another's. While usually all players would use playing pieces having equal lengths, it is possible for different players to use playing pieces having different lengths so that the player using the longer playing piece is given a "handicap" (an advantage).

While the ordinary strings 80a–80f of FIG. 6A can be "tacked" to the playing surface, FIG. 6B illustrates a preferred string/playing surface attachment arrangement. In the embodiment of FIG. 6B, a string 82 which functions as a playing piece includes a plurality of pins 85 attached thereto for use in attaching string 82 to a playing surface. Each pin 85 includes a ring 86 which encircles string 82 and a tab 87 which extends radially outward from the ring 86. Blocking portions 89a and 89b are formed on each end of string 82 to maintain pins 85 on string 82. The tabs 87 are used to attach string 82 to the playing surface by insertion thereof into eyelets formed in the playing surface. The playing surface can, for example, include a sturdy cardboard base having a map illustrated thereon, with the eyelets being formed in the cardboard base.

FIG. 7 illustrates a deck of cards 84 which can be used in the game according to the present invention. Each of the cards in the deck of cards 84 includes indicia corresponding to one of the subregions located on the playing surface. While cards having the name of a particular subregion thereon (in the example provided, the name of a state) can be used, the presently described game can also utilize an ordinary deck of playing cards. When an ordinary deck of playing cards is used, a conversion chart 90, illustrated in FIG. 8, is used for correlation of the suit and number contained on the ordinary playing card to a selected state. The correlation chart can also include additional information such as, for example, the capital city and largest city in each state. Wild cards such as, for example, the ace of spades and the jokers of the ordinary playing deck can be provided wherein the player who selects the wild card can attach their playing piece to any one subregion which that player can identify.

Figure 9:
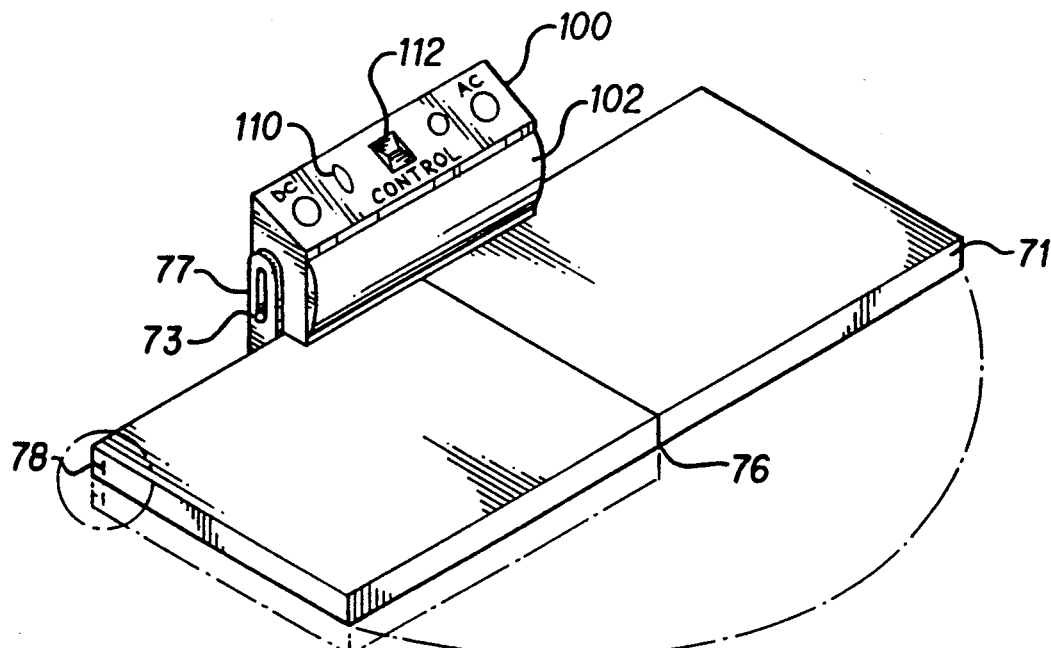
FIG. 9 is a perspective view of the game board and one controller (auxiliary timer/light source) usable with the present invention.
Figure 9A:
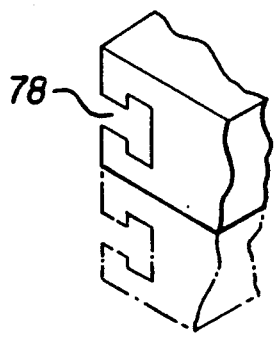
FIG. 9A is an enlarged view of the circled portion of FIG. 9.

FIG. 9 is a perspective view of a foldable base 71 having a hinged connection 76 between its two halves. A controller (also referred to as an auxiliary timer/light source) 100 is also provided so that the game can be played using the DC power source provided by the safety alertness monitoring system illustrated in FIGS. 1-4 or a conventional 110 volt AC power source. Additionally, auxiliary timer/light source 100 can be used to provide light for playing the game in darkness (e.g., in a car during darkness). The light source 102 can also be used to provide an indication of the actuation of the timer and the expiration of the preset time period. A power switch 110 and a play switch 112 are also provided and will be described below. Sides of the base 71 can include slots 78 which extend along the entire length of each half of base 71. FIG. 9A shows the slot 78. Tabs (not shown) contained on bracket 77 slide into the slots 78 of each half of base 71 in order to maintain the base in a stable open position and to attach the base to the auxiliary timer/light source 100. One bracket 77 is provided on each side of controller 100 (only one bracket is shown). Each bracket 77 includes an elongated slot which receives a releasable fastener 73 (e.g., a bolt and wing nut). Releasable fastener 73 functions to securely attach brackets 77 to controller 100. The elongated slots in brackets 77 permit the position of the controller 100 to be adjusted so that when the tabs of the brackets 77 are inserted into slots 78, and fasteners 73 are tightened, controller 100 "clamps" onto base 71 so as to firmly maintain base 71 in the open position, or in the closed position when not in use.

Figure 11:
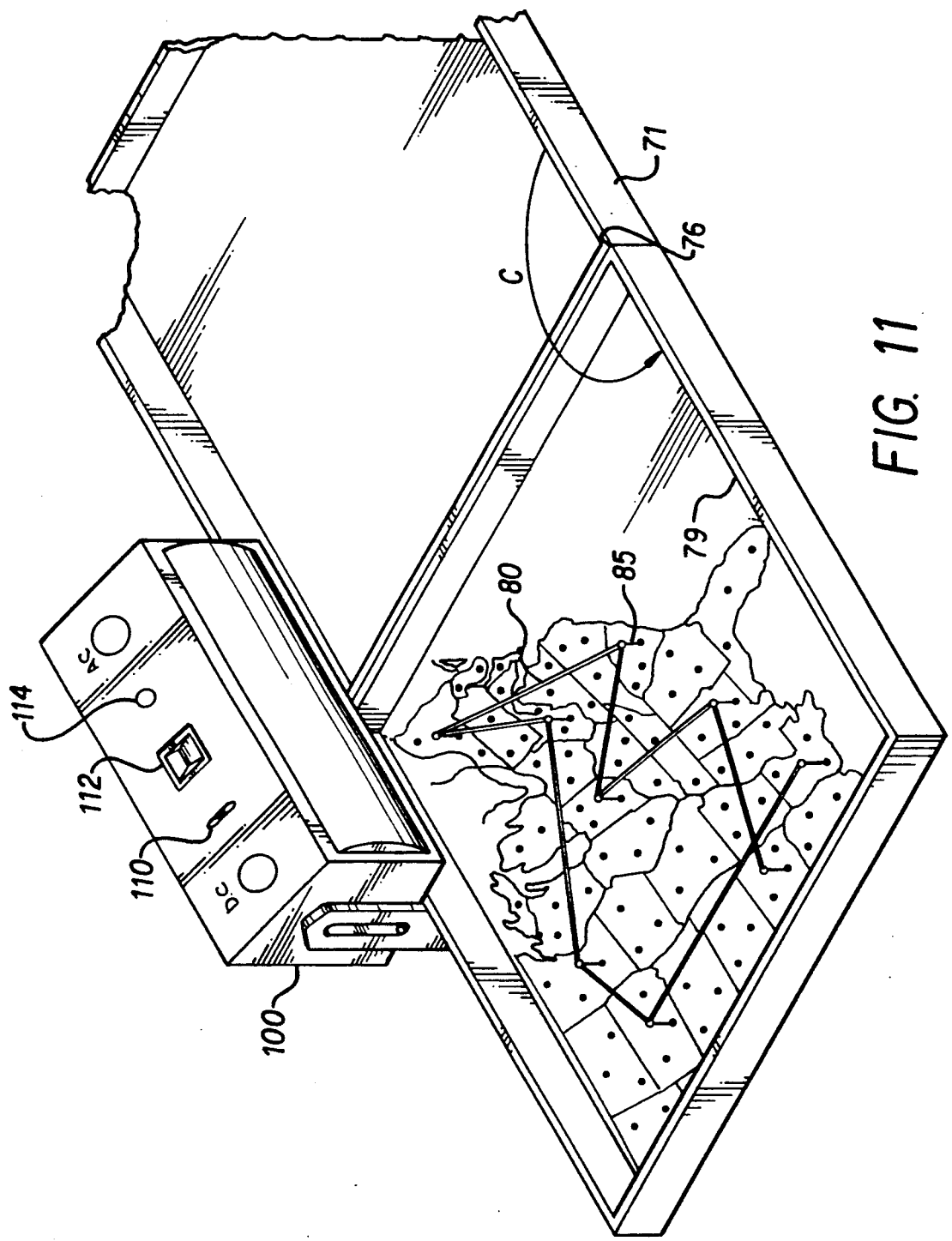
FIG. 11 is a perspective view of the opposite side of the game board shown in FIG. 9 which is particularly suited for use in an automobile.

FIG. 11 shows the opposite side of base 71. The opposite side of each half of base 71 contains ridges 79 thereon so as to prevent the playing pieces and pins 85 from being lost, particularly when play takes place in an automobile. Each half of the ridged side of base 71 can have an individual geographical area (in the present example a map of the United States) therein so that each player uses their own map. Alternatively, both players could use the map contained in one of the halves, with the other half being used merely as a holding tray. When base 71 of FIG. 11 is turned over (as shown in FIG. 9) one large flat playing surface is provided which could contain a larger sized map. The hinged connection 76 can be provided on the ridged side of the halves of the base portions so that the halves can be moved along line C to form a storage compartment when the game is not being played. The various components of the game (e.g., playing pieces, pins, cards, maps, correlation charts, score sheets) can be stored in the storage compartment. A pair of tabs (not shown) can be provided on bracket 77 to maintain the halves of the base closed, and to attach controller 100 to the base during periods of non-use.

Figure 12A:
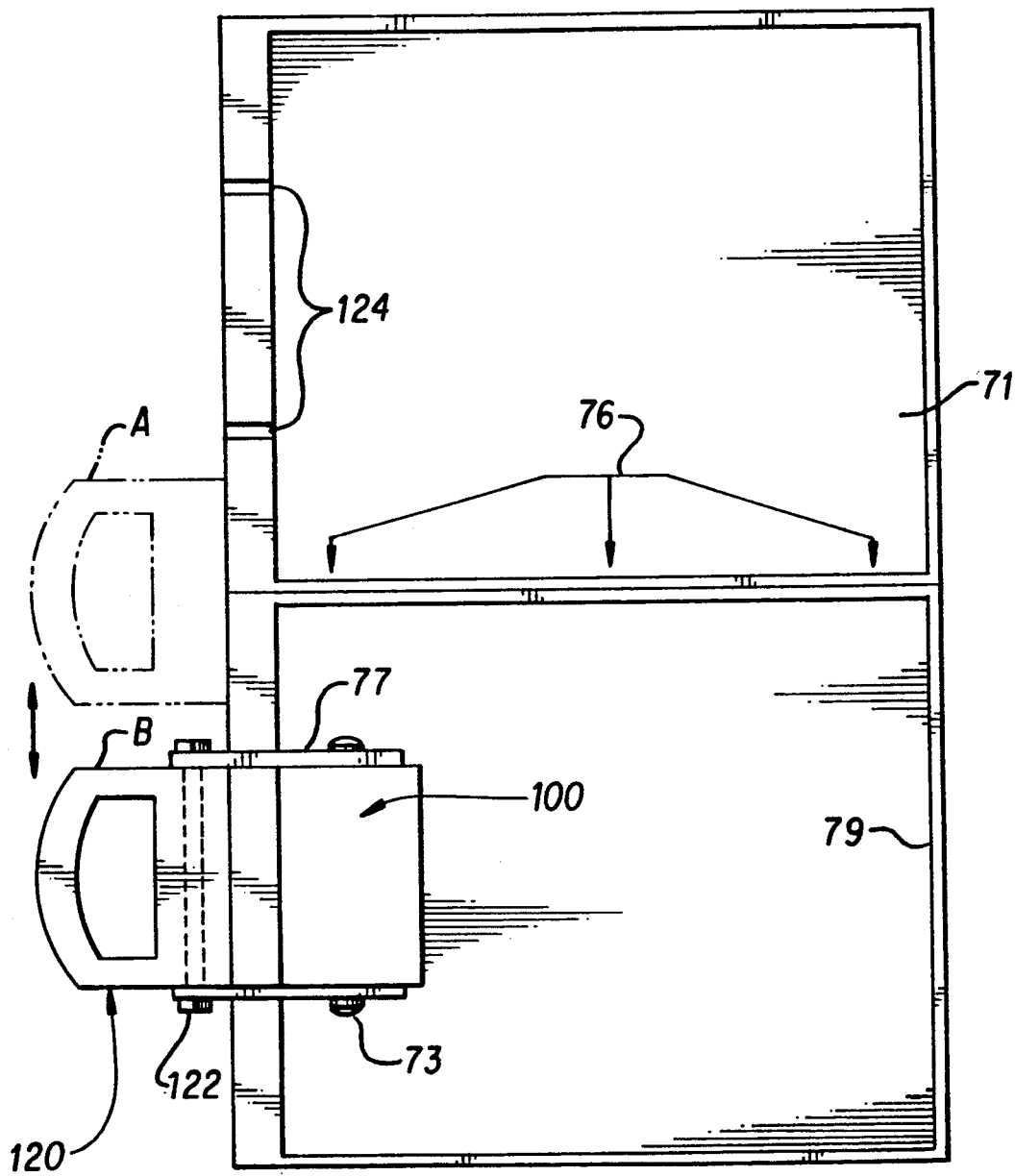
FIGS. 12A and 12B are plan and side cross-sectional views illustrating a preferred structure for attaching the controller to the game board.
Figure 12B:
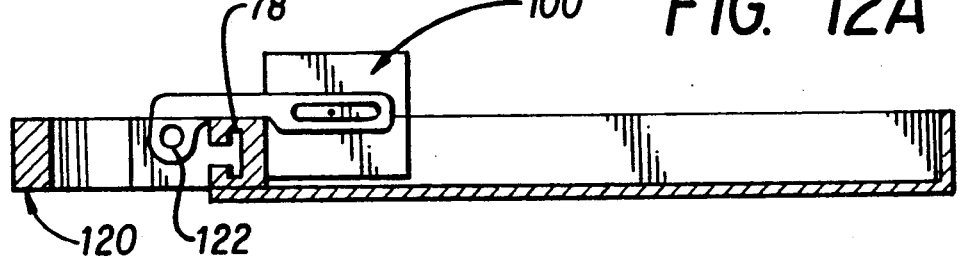

A preferred arrangement for attaching the controller 100 to the gameboard is shown in FIGS. 12A and 12B. This arrangement provides a handle 120 which permits the game to be carried easily. This arrangement also permits controller 100 to be stored within the gameboard when the halves of base 71 are folded together during periods of non-use. This provides a convenient enclosure around the controller 100 during periods of non-use without requiring dis-assembly of the controller 100 from the base portion. In the arrangement of FIGS. 12A and 12B, the pair of tabs for insertion into slot 78 are provided on the handle 120, and the brackets 77 are pivotally attached to handle 122 with, for example, nuts and bolts which can be tightened and loosened easily. Slots 124 are provided in one of the rims 79 on each half of base 71 to receive brackets 77 when controller 100 is stored. The handle 120 and associated controller 100 are located at position A during use of the game, and at position B during storage.

Figure 10:
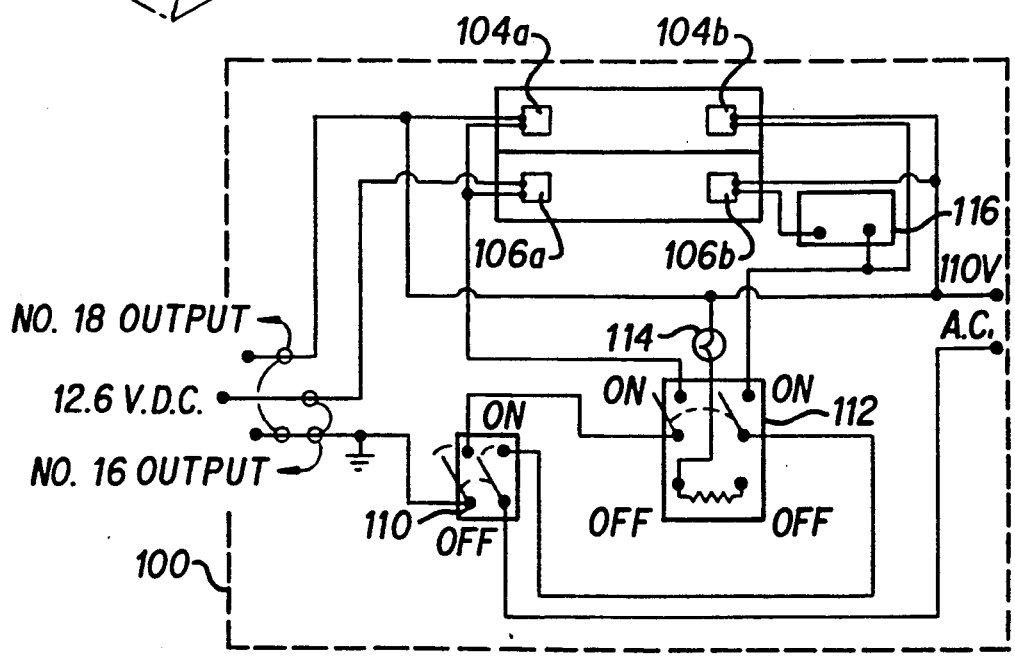
FIG. 10 is a schematic circuit diagram of a controller (auxiliary timer/light source) usable with the present invention.

FIG. 10 schematically illustrates the circuitry used in the auxiliary timer/light source 100. Use of the auxiliary timer/light source 100 with the DC voltage supplied by the safety alertness monitoring system of FIGS. 1-4 will first be described.

Separate jacks are provided for electrically connecting auxiliary timer/light source 100 to outputs 18 and 16 of the safety alertness monitoring system. Alternatively, a single jack having a pair of two-pronged connectors on one end for attachment to outputs 16 and 18, and a single three-pronged connector for attachment to controller 100 on the other end can be provided. It will be recalled that output 18 is supplied with current during the first and second predetermined time periods of the safety alertness monitoring system, but is supplied with no current upon the expiration of the first and second predetermined time periods. Output 16 of the safety alertness monitoring system is not provided with current during the counting of the first and second predetermined time periods, but is supplied with current only after expiration of the second predetermined time period (when buzzer 40 is sounded). It should be noted that when controller 100 is used with the safety alertness monitoring system, the preset time period which corresponds to a player's turn is equal to the sum of the first and second predetermined time periods of the safety alertness monitoring system.

In order to play the game, power switch 110 and play switch 112 are switched to their ON position. When switch 22 of the safety alertness monitoring system is actuated to begin counting the first predetermined time period (for example, by the vehicle operator), power is supplied to play light 104a which provides sufficient light for the game to be played in darkness. Upon expiration of both the first and second predetermined time periods of the safety alertness monitoring system, power to output 18 is cut-off and power is supplied to output 16 so that play light 104a will be turned off while alarm light 106a, which can be a red light, is supplied with power to indicate that the player's turn has come to an end. If play switch 112 is switched to the OFF position, while the safety alertness monitoring system is being used by the vehicle operator, pilot light 114 will be lighted to indicate that power switch 110 should be turned off.

When attached to an AC voltage supply, a player's turn is initiated by switching power switch 110 and play switch 112 to their ON positions. At this time, play light 104b will be provided with power to light the playing surface and timer 116 will begin counting the time period (the preset time period) which defines the length of each player's turn. Upon expiration of the preset time period, timer 116 supplies power to light 106b (which can be a red light) to indicate that the player's turn has come to an end. The next player starts their turn by moving play switch 112 to the OFF position, and then back to the ON position to reinitiate timer 116. Should play switch 112 be left in the OFF position, pilot light 114 will be lighted to indicate that power switch 110 should be switched off.

The general manner of play having been described, the game illustrated in FIGS. 5-11 can be played according to the following basic and optional rules. In order to win, a player must: (a) attach their playing piece to at least 6 states; (b) perform a predefined goal with their playing piece; and (c) score 100 points or above. Optionally, a player could win by performing steps (a) and (b) above while scoring 50 points or less. This introduces another level of strategy, particularly if multiple rounds of the game are played, with each player's points being accumulated, and when bonus points are given to players who win each round. Players score 5 points for identifying a state indicated on a first selected card, but do not score 5 points for identifying a state indicated on a second selected card within one turn (although in either case, the player's playing piece is attached to the state if identified). Players optionally can be penalized 5 points for failure to identify a state on a second selected card. Players receive 10 additional points for identifying the capital of a selected state, or for identifying other information (e.g., the largest city) regarding that state.

Bonus points can also be optionally scored for: selecting a wild card; being the first player to reach, for example, Alaska, Hawaii, or Washington, D.C.; the player with the highest score over 100 points at the end of the game; the player with the highest number of stops at the end of the game; the player who wins the game (performs the predefined goal while stopping at least the minimum number of subregions and scores more than 100 points or less than 50 points). Further options can be, for example: selecting the card for Washington, D.C.— score 5 points, go to Washington D.C. and take another turn; selecting the card for Alaska or Hawaii—score as usual and also return to a west coast state; selecting the ace of spades —score 5 points and move to any state except for Alaska or Hawaii; select a joker—score 10 points and move to any state except Alaska or Hawaii. A 5 point penalty can also be assessed for crossing one's own line (unless this occurs to end and win the loop game).

As stated earlier, players must perform a predefined goal with their playing pieces. The ability to select different predefined goals permits different variations of the game to be played. Two examples of games are the "Loop Train" game and the "Coast-to-Coast Train" game. In the Loop Train game, players must form a loop with their playing piece while making at least a minimum number of stops. A player optionally cannot cross their own playing piece unless that player is making the winning move of the game (i.e., attaching their playing piece to the last subregion required to have the minimum number of stops). Each player can either start at a common starting point, select any point as a starting point, or allow their first card selection to define their starting point. In the Coast-to-Coast game, players must extend their playing piece from an Atlantic to a Pacific coast state while making at least a minimum number of steps therebetween. Players optionally cannot cross their own or another player's playing piece. Starting points can be determined as set forth above, although it is preferable to permit each player to initially attach one end of their playing piece to a coastal state instead of relying on their first card selection.

When the length of the playing pieces is, for example, 24 inches, the length of the United States provided on the playing surface is preferably about 12 inches.

An unlimited number of persons can play this game at one time using one or several map-boards. The maximum number of players per board should be determined according to the level of competition desired. The level of competition can also be increased by adoption of one or more of the options to the basic rules set forth above. Players can compete individually or in teams. Additionally, the rules can vary for different boards during the same game according to the age groups, knowledge of the game, competitive skills, etc., of the players on each respective board.

While the present invention is described with reference to a particular embodiment, this embodiment is intended to be illustrative, not limiting. Various modifications may be made without departing from the spirit and scope of the invention as defined in the appended claims.

For example, since the New England states are small and closely spaced, it is possible to group them into one area (New England) on the playing surface with a plurality of attachment points being provided therein. However, cards would still be provided for each state, and the capital of each state can still be identified to score the second amount of points.

An entire series of games for learning different geographical areas can be provided. An illustrative list of possible geographical areas includes: the entire world; the United States of America; the African Continent; Asia; the Caribbean Islands; Europe; the countries surrounding the Mediterranean Sea; the countries surrounding the Persian Gulf-Arabian Sea; the countries surrounding the Red Sea; and the South American Continent. The predefined goal can also be, for example, crossing a body of water (e.g., the Persian Gulf) one or more times (while attaching one's playing piece to the playing surface at least a predetermined number of times and scoring the predetermined level of points).

What is claimed is:

1. A game comprising:
    a playing surface having a geographical area divided into subregions illustrated thereon, said geographical area and said subregions having geographically significant shapes;
    a plurality of elongated, flexible members,
    each member having a length which is longer than a largest dimension of said geographical area;
    attaching means for individually attaching each of said plurality of elongated flexible members to said playing surface within a plurality of said subregions;
    timer means for counting a preset time period and for issuing an alarm signal upon expiration of said preset time period; and
    a plurality of cards, at least one card corresponding to each of said subregions, each card having indicia thereon which represents one of said subregions.

2. The game according to claim 1, wherein said attaching means comprises a plurality of attaching elements which are individually attachable to said playing surface within each of said subregions.

3. The game according to claim 1, wherein each of said elongated, flexible members includes indicia which associates a respective one of said elongated, flexible members with a particular player.

4. The game according to claim 3, wherein said indicia for each elongated, flexible member is a color, each elongated, flexible member having a different color.

5. The game according to claim 1, wherein said indicia on each card represents a name of a corresponding subregion.

6. The game according to claim 1, wherein said plurality of cards is a deck of playing cards, said game further comprising:
    a correlation chart which correlates each playing card with at least a name of one of said subregions.

7. The game according to claim 1, wherein said geographical area is a map of the United States, each of said subregions being a particular state.

8. The game according to claim 1, further comprising:
    a light source attached to said playing surface and being capable of emitting light having an intensity sufficient to illuminate said playing surface, to enable the playing of said game in darkness.

9. The game according to claim 8, wherein said light source is electrically connected to said timer means so that said light source is turned on when said preset time period begins to be counted by said timer means, and said light source is turned off upon the expiration of said preset time period.

10. The game according to claim 1, wherein each of said elongated, flexible members has an equal length.

11. A method of playing a geographical game, said game having: a playing surface having a geographical area divided into subregions illustrated thereon, said geographical area and said subregions having geographically significant shapes; a plurality of elongated, flexible members, each member having a length which is longer than a largest dimension of said geographical area; attaching means for individually attaching each of said plurality of elongated flexible members to said playing surface within a plurality of said subregions; timer means for counting a preset time period and for issuing an alarm signal upon expiration of said preset time period; and a plurality of cards, at least one card corresponding to each of said subregions, each card having indicia thereon which represents one of said subregions; said method comprising:
    (a) determining an order of play as between a plurality of players which are to play said game;
    (b) each player selecting one of said plurality of flexible, elongated members as a playing piece;
    (c) the following steps being performed for each player, one player at a time, according to said order of play:
        i) actuating said timer means to initiate the counting of said preset time period;
        ii) selecting a first card and either: identifying a subregion on said playing surface which corresponds to the indicia on said card, collecting a first number of points, and attaching a portion of that player's elongated, flexible member to said playing surface within the subregion which corresponds to the indicia on said selected first card; discarding the first card, selecting a second card and identifying a subregion on said playing surface which corresponds to the indicia on said second card without collecting said first number of points, and attaching a portion of that player's elongated flexible member to said playing surface within the subregion which corresponds to the indicia on said second card; or failing to identify the subregions on said playing surface which corresponds to the indicia on said selected first and second cards prior to expiration of said preset time period; and
    (d) repeating the steps set forth in part (c) until a player accumulates a first predetermined level of points, has attached their elongated, flexible member to said playing surface within at least a predetermined minimum number of subregions, and has arranged their elongated, flexible member on said geographical area, according to its attachment to said subregions, so as to achieve a predefined goal.

12. The method according to claim 11, wherein said predefined goal is extending one's elongated, flexible member entirely across said geographical area.

13. The method according to claim 12, wherein said geographical area is the United States, each subregion being a particular state, the indicia on said cards represents a name of a state, and said additional information is a capital of a state, whereby the players must identify a state by location and the capital of that state to collect said first and second numbers of points.

14. The method according to claim 11, wherein said predefined goal is forming a loop in said geographical area so that one's elongated, flexible member intersects itself.

15. The method according to claim 11, further comprising: during part (c), after identifying the subregion which corresponds to the indicia on one of said first and second cards, and prior to expiration of said preset time period, identifying additional information regarding the identified subregion and collecting a second number of points.

16. The game according to claim 11, wherein said game is played according to an additional rule that one player's elongated, flexible member cannot intersect another player's elongate flexible member.

17. The game according to claim 16, wherein said game is played within an automobile and wherein said timer means is actuated by an operator of said automobile.

18. A method of playing a geographical game, said game having: a playing surface having a geographical area divided into subregions illustrated thereon, said geographical area and said subregions having geographically significant shapes; a plurality of elongated, flexible members, each member having a length which is longer than a largest dimension of said geographical area; attaching means for individually attaching each of said plurality of elongated flexible members to said playing surface within a plurality of said subregions; timer means for counting a preset time period and for issuing an alarm signal upon expiration of said preset time period; and a plurality of cards, at least one card corresponding to each of said subregions, each card having indicia thereon which represents one of said subregions; said method comprising:

(a) determining an order of play as between a plurality of players which are to play said game;

(b) each player selecting one of said plurality of flexible, elongated members as a playing piece;

(c) the following steps being performed for each player, one player at a time, according to said order of play:
  i) actuating said timer means to initiate the counting of said preset time period;
  ii) selecting a first card and either: identifying a subregion on said playing surface which corresponds to the indicia on said first card, collecting a first number of points, and attaching a portion of that player's elongated, flexible member to said playing surface within the subregion which corresponds to the indicia on said selected first card; or failing to identify the subregion on said playing surface which corresponds to the indicia on said selected first card prior to expiration of said preset time period; and (d) repeating the steps set forth in part (c) until a player accumulates a first predetermined level of points, has attached their elongated, flexible member to said playing surface within at least a predetermined minimum number of subregions, and has arranged their elongated, flexible member on said geographical area, according to its attachment to said subregions, so as to achieve a predefined goal.

19. The method according to claim 18, further comprising: during part (c), after identifying the subregion which corresponds to the indicia on said first card, and prior to expiration of said preset time period, identifying additional information regarding the identified subregion and collecting a second number of points.

20. The method according to claim 18, further comprising: during part (c), and prior to expiration of said preset time period, permitting a player to discard said first selected card without identifying the subregion on said playing surface which corresponds to the indicia on said first selected card, select a second card, identify the subregion on said playing surface which corresponds to the indicia on said second selected card, and attach their playing piece to said identified subregion.

* * * * *